United States Patent [19]

Shaw

[11] Patent Number: 4,788,920

[45] Date of Patent: Dec. 6, 1988

[54] SPATIAL TRANSPLANTER MECHANISM

[75] Inventor: Lawrance N. Shaw, Gainesville, Fla.

[73] Assignee: University of Florida, Gainesville, Fla.

[21] Appl. No.: 19,515

[22] Filed: Feb. 26, 1987

[51] Int. Cl.$^4$ .............................................. A01C 11/02
[52] U.S. Cl. ........................................ 111/2; 111/91; 198/474.1; 414/501
[58] Field of Search .......................... 111/2, 3, 89–91; 239/37, 38 A, 40, 43, 44; 414/501, 502; 198/408, 474.1, 476.1; 301/48; 172/91, 92, 94, 95, 545, 546

[56] References Cited

U.S. PATENT DOCUMENTS

| | | | |
|---|---|---|---|
| 1,806,622 | 5/1931 | Gibbens | 111/3 |
| 1,963,591 | 6/1934 | Pomieraniec | 111/3 |
| 1,996,686 | 4/1935 | Poll | 111/3 |
| 2,009,785 | 7/1935 | Pomieraniec | 111/3 |
| 2,275,978 | 3/1942 | Mingle | 198/476.1 |
| 2,739,548 | 3/1956 | Poll | 111/3 |
| 3,125,044 | 3/1964 | Kolk | 111/2 |
| 3,374,752 | 3/1968 | Shirozu | 111/2 |
| 3,872,805 | 3/1975 | Kolk et al. | 111/91 |
| 4,290,373 | 9/1981 | Boots et al. | 111/3 |
| 4,294,179 | 10/1981 | Cayton et al. | 111/3 |
| 4,355,588 | 10/1982 | Armstrong et al. | 111/3 |
| 4,440,101 | 4/1984 | Edwards et al. | 111/2 |
| 4,455,950 | 6/1984 | Pretzer | 111/2 |

FOREIGN PATENT DOCUMENTS

| | | | |
|---|---|---|---|
| 3130795 | 7/1983 | Fed. Rep. of Germany | 111/91 |
| 819003 | 4/1981 | U.S.S.R. | 198/408 |

Primary Examiner—James R. Feyrer
Attorney, Agent, or Firm—Dennis P. Clarke

[57] ABSTRACT

A transplanter machine rotates seedling plants from a horizontal file to a vertical orientation by use of a plant holder which has a dwell when in a loading position. The plant holder will accelerate the seedling plants from a relatively low velocity to a velocity that is matched to the machine travel speed such that the plant is inserted into the ground at a zero velocity relative to the ground. The plant holders are mounted upon holder arms which are pivotably connected to a rotating hub. Each holder arm is connected to a link which causes the holder arm to fold and unfold as the plant holder travels in a path about a rotation axis.

17 Claims, 4 Drawing Sheets

SPATIAL TRANSPLANTER MECHANISM

BACKGROUND OF THE INVENTION

This invention relates a transplanter system for receiving a plant and inserting it into the ground.

Crop establishment by means of transplants is widely used for numerous plants including vegetables, ornamental crops, tobacco, and, increasingly, sugar beets. Crop establishment by transplanting of plants has been used for many years because of many advantages that transplanting has over direct seeding.

Among the factors which have limited the use of transplants for crop establishment are the requirements for nurseries or greenhouses for seedling plant production, high labor requirements for rearing the seedling plants, and high labor requirements for transferring the plants to the fields.

With the advent of the use of growing trays in modular growing systems such as "Speedling", "Superspeedling", "Blackmore", and "Paper Pot", plant production of seedlings has been largely automated. Soil or growing media handling systems and planting operations are now becoming mechanized and specialized greenhouses make possible the production of seedlings without high labor requirements.

A continuing problem in crop establishment by transplanting is the high labor requirements in the field. There is an absence of acceptable mechanized transplanting machines for the popular seedling growth systems such as modular seedlings. (Modular seedlings are defined as plants growing in soil blocks or cells in contrast to bare root seedlings which have been removed from the soil and have no soil attached to the roots.)

Although numerous transplanting systems have been developed, most of them are unable to use a popular or widely accepted modular growing system. The transplanting systems or mechanisms have generally been slow with planting speeds of less than two kilometers per hour (1.5 miles per hour). Most of the transplanting systems are limited in use to a particular seedling production system.

Present wheel type transplanters deliver plants to the soil at zero relative velocity (which is desirable to avoid damage to the plant during the transplanting process), but have required the hand-feeding of plants because plant feeding mechanisms are inadequate to properly place plants onto the wheel mechanisms while the wheel mechanisms are operating at a high rate of speed. The desirable feature of placing the plants into the ground at zero relative velocity means that a wheel type of transplanter must have the wheel mechanism rotating sufficiently fast that its velocity at its outer rim is essentially equal in magnitude and opposite in direction to the speed of the vehicle upon which the transplanter system is mounted. However, the faster the vehicle goes (desirable for quickly transplanting a large number of plants), the harder it is to hand-feed plants (or to use mechanically feeding arrangements of any sort) to the quickly rotating wheel mechanism.

OBJECTS AND SUMMARY OF THE INVENTION

Accordingly, it is a primary object of the present invention to provide a new and improved transplanter system.

A more specific object of the present invention is to provide a transplanter system which is relatively easy to feed plants onto.

Yet another object of the present invention is to provide a transplanter system which will transplant plants at a high rate of speed.

A further object of the present invention is to provide a relatively simple and reliable transplanting system.

A further object of the present invention is to provide a transplanter system which provides for easy loading of plants so as to accommodate easy and quick manual loading of plants and, especially, to readily accommodate feeding from mechanical plant feeders.

The above and other features of the present invention which will become more apparent as the description proceeds are realized by a transplanter system comprising: a support assembly; a plurality of holders, each holder supported by the support assembly and operable to releasably hold a plant; drive means to move each of the holders from an upper, loading positions whereat a plant may be placed in the holder to a lower, unloading position whereat the holder will release any plant held by it; and varying means operable to automatically vary the velocity of each holder as it moves between its loading position and its unloading position such that the velocity of the holder is relatively small when the holder is in its loading position and is relatively large when the holder is in its unloading position. The drive means moves each holder in a continuous manner during operation of the system and the system is operable during continuous movement relative to the ground (i.e., the system does not have to be stopped repeatedly relative to the ground either for loading or unloading of plants from the holders). Each holder moves in a circle of 360° from its loading position to its unloading position by a first path and from its unloading position back to its loading position by a second path distinct from the first path. Each holder has an uppermost position within 15° of its loading position. Each holder defines an orientation line along which the stalk of a plant will be disposed and the orientation line of each holder is within 20° of horizontal when the holder is in its uppermost position and within 10° of vertical when the holder is in its unloading position. The drive means moves each holder at a constant angular velocity about a rotation axis when transplanting at a constant rate and the varying means varies a radius from each holder to the rotation axis in order to vary the velocity of each holder. The system further includes a plurality of holder arms, each holder arm having a first end and second end, at least a corresponding one of the holders mounted at each first end, each second end rotatably supported by the support assembly such that each holder is supported by the support assembly by way of one of the holder arms. The support assembly includes a rotatable hub mounted on an axle, the rotation axis extending lengthwise through the axle, and each holder arm is pivotably mounted to the rotatable hub. The varying means includes a plurality of links, each link having a first end pivotably attached to a corresponding holder arm and operable to fold the corresponding holder arm in towards the rotation axis when the corresponding holder assumes its loading position and operable to unfold the corresponding arm away from the rotation axis when the corresponding holder assumes its unloading position. Each link has a second end pivotably attached to a rotating spider. Each holder includes two (2) holder parts pivotably connected together and operable to normally be closed and to pivot open when the holder is in its unloading position.

The present invention may alternately be described as a transplanter system comprising: a plurality of holders, each operable to releasably hold a plant; a plurality of holder arms, each holder arm having a first end and a second end and at least a corresponding one of the holders mounted at the first end; a support assembly defining a rotation axis and rotatably supporting each of the second ends for rotation about the rotation axis; drive means to rotate each of the holder arms and corresponding holders about the rotation axis; and varying means operable to automatically vary the radius from each holder to the rotation axis as each holder rotates about the rotation axis such that the radius is relatively small when the holder is in an upper, loading position whereat a plant may be placed in the holder and it is relatively large when the holder is in a lower, unloading position whereat a holder will release any plant held by it. The system further includes a chassis movable in a forward direction relative to the ground and wherein the drive means moves each holder in a continuous manner during operation of the system (i.e., each holder is always rotating and/or engaged in translational movement of at least a small magnitude) and the system is operable during continuous movement relative to the ground. The holder has it smallest radius within 15° of an uppermost position. The drive means moves each holder in a backward direction when the holder is in its unloading position and each holder moves at least partially in a sideways direction perpendicular to the forward direction, between its loading position and its unloading position.

BRIEF DESCRIPTION OF THE DRAWINGS

The above and other features and advantages of the present invention will be more readily understood when the following detailed description is considered in conjunction with the accompanying drawings wherein like characters represent like parts throughout the several views and in which.

DETAILED DESCRIPTION

Figures 1, 2:
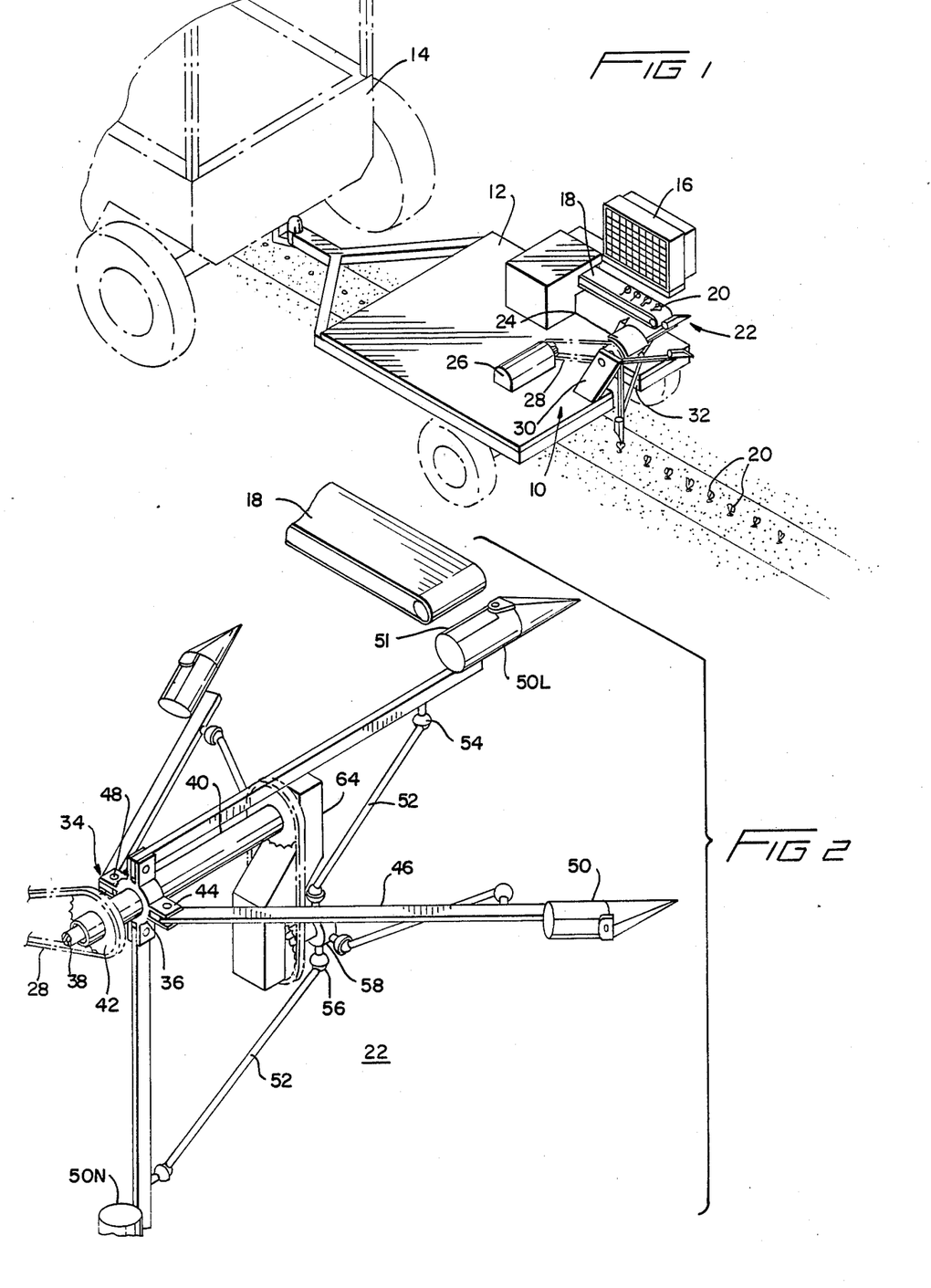
FIG. 1 is a simplified perspective view of the transplanter system of the present invention being pulled by a powered vehicle.
FIG. 2 is an enlarged perspective view of parts of the present invention.

The transplanter system 10 of the present invention, as illusrated in FIG. 1 moves upon a trailer 12 having the illustrated wheels and chassis when pulled by a powered vehicle 14 which could be a tractor, all-terrain vehicle, or truck. As the description proceeds, it will be readily apparent that the transplanter system 10 of the present invention could be incorporated directly into a powered vehicle, instead of into a trailer.

Mounted upon the trailer 12 is a plant tray 16 and a conveyor belt 18 which may receive modular seedling plants 20 from the plant tray 16. The plants 20 would be disposed in the cells of the plate tray 16 with the stalks of the plants extending horizontally (plants not shown within the cells in FIG. 1). The plants 20 may be moved from the plant tray 16 and placed upon the conveyor 20 manually or alternately by a plant gripper consisting of two horizontally extending parallel fingers (not shown) which press together to pull plants sequentially out of the plant tray 16. Since the movement of the plants from the plant tray 16 to the conveyor 18 is not a central feature of the present invention, this part of the operation need not be described in detail.

A transplanter machine 22, which receives plants 20 from the conveyor belt 18 or from manual placement, is central to the transplanter system 10 of the present invention. The transplanter machine 22 includes a shield 24 to protect various moving parts from debris, a motor 26 serving as a drive means to drive various mechanisms by way of a chain-drive 28 and a support plate 30 to hold various mechanisms off the floor of the trailer 12. The transplanter machine 22 receives the plants from conveyor belt 18 or from manually loading and plants them into the ground in a straight row at equally spaced intervals while the trailer 12 is moving at a preferably constant velocity. A notch 32 in the floor of the trailer 12 allows the transplanter machine 22 to deposit plants into the ground.

Figure 3:
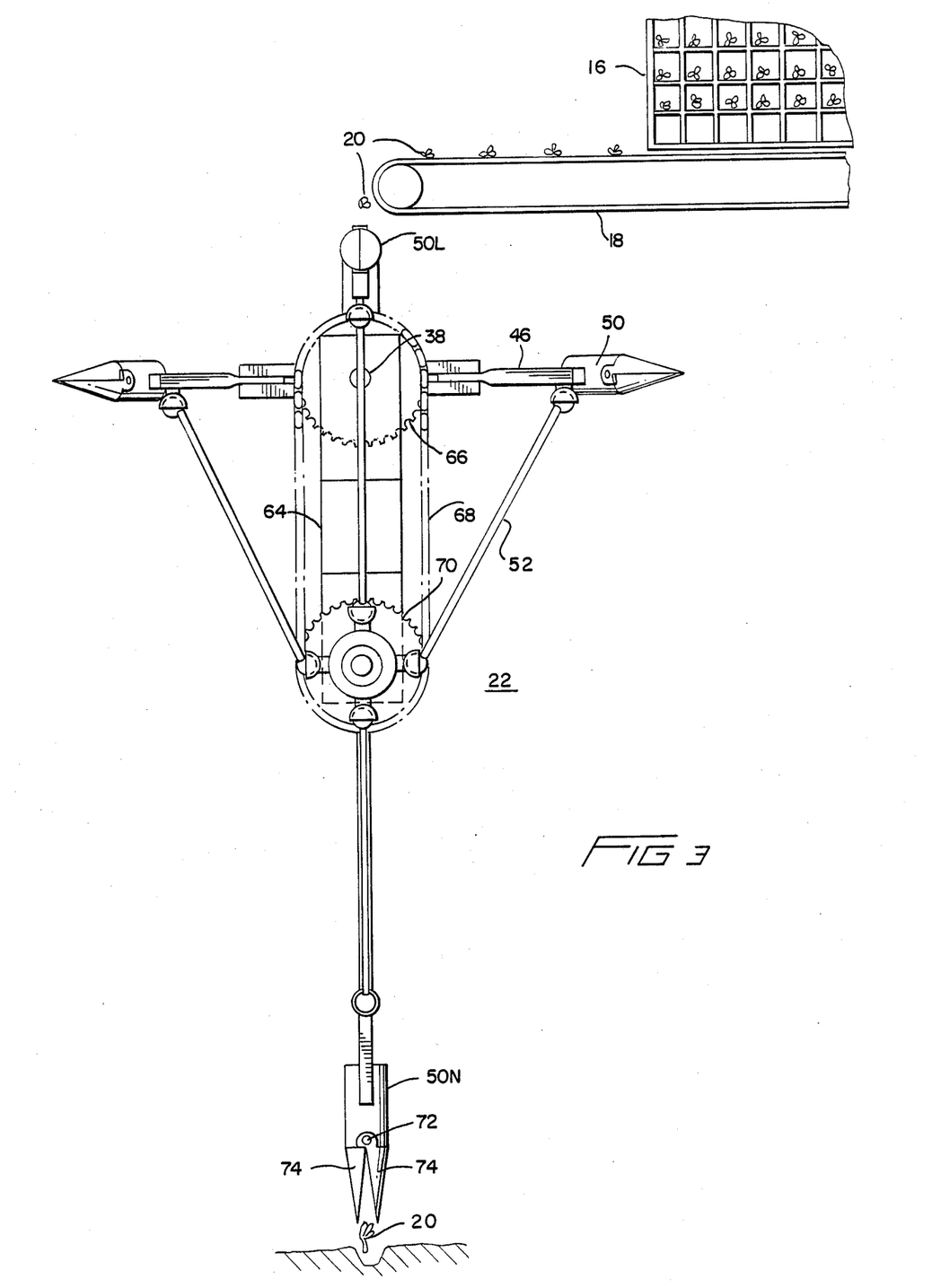
FIG. 3 is a simplified side view of parts of the present invention.
Figure 4:
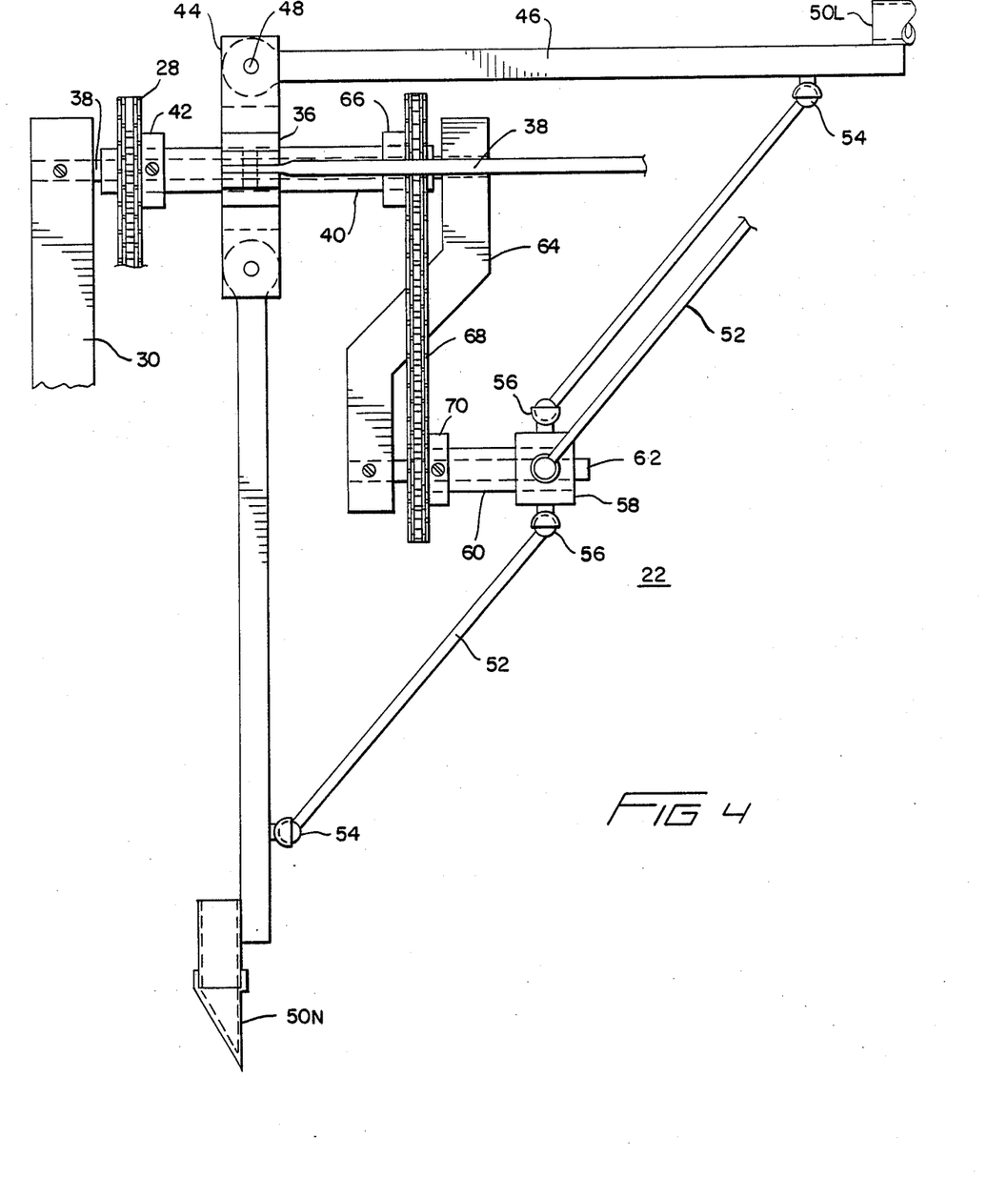
FIG. 4 is a front view of parts of the present invention.

Continuing to consider FIG. 1, but also considering the view of FIGS. 2, 3, and 4, the details of the transplanter machine 22 will be discussed. FIGS. 2-4 have left out several components for ease of illustration.

The transplanter machine 22 has a support assembly 34 including a rotatable hub 36 mounted on an axle 38 by way of a rotatable sleeve 40 to which the hub 36 is fixed. The sleeve 40 and hub 36 rotate together when the chain drive 28 drives sprocket 42 which is fixed to the sleeve 40.

The rotatable hub 36 includes a plurality of pairs of mounting flanges 44. Each of the pairs of flanges 44 pivotably mount a support arm 46 by way of a pin 48 extending between the pair of flanges 44. Each of the support arms 46 supports a corresponding plant holder 50. Although four pairs of flanges 44 are illustrated, more or less pairs of flanges and corresponding more or less plant holders 50 could be used.

As illustrated, the plant holders 50 will rotate about the rotation axis extending through the center of axle 38 while simultaneously pivoting about pivot pins 48 such that the plant holders 50 assume a loading position 50L which is relatively close to the rotation axis of axle 38 and assume an unloading position 50N which is relatively far away from the rotation axis. As clearly appears from FIG. 2, each of the holder arm pivot axes corresponding to pivot pins 48 is askew to the rotation axis of axle 38. The arrangement which provides for the pivoting of the holder arms 46 relative to the flanges 44 even as the rotatable hub 36 rotates about the rotation axis includes a link 52 corresponding to each of the holder arms 46. The link has a ball and socket 54 at a first end connecting the link 52 to a corresponding one of the holder arms 46. Specifically, the ball and socket 54 is connected adjacent a first end of the holder arm 46 upon which the holder 50 is mounted, whereas the second end of the holder arm 46 is pivotably connected at the flanges 44. Each of the links 52 includes a second end ball and socket 56 attached to a rotating spider 58 fixed to a rotating sleeve 60 which rotates about a second rotation axis extending lengthwise through the center of a spider axle 62 fixed to support piece 64 having its upper end fixed to the axle 38. The spider axis extending centrally through the spider axle 62 extends horizontally and parallel to the likewise horizontal rotation axis extending centrally in the axle 38. It should be appreciated that each of the axles 38 and 62 are fixed but define rotation axes about which the corresponding sleeves 40 and 60 rotate.

The rotatable sleeve 40 has a second sprocket 66 mounted for rotation therewith and operable to drive a chain belt drive 68 which in turn drives a sprocket 70 fixed to the rotatable sleeve 60.

As best shown in FIG. 3, the plant holder in the position 50N will open by virtue of a pivot connection 72 between two holder or cup halves 74. This will allow the plant 20 to drop into the ground. The opening of the cup or holder halves 72 when the holder 50 assumes its 50N unloading position may be accomplished by various mechanisms. For example, a spring loaded arrangement may normally bias the holder parts 74 together, but may include a gravity operated latch such that the spring stops biasing the parts 74 together when the holder 50 assumes its unloading position 50N.

Figure 5:
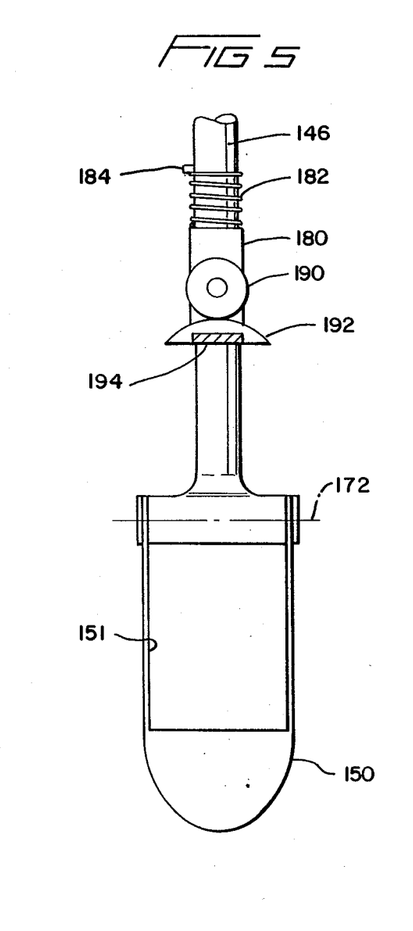
FIG. 5 is a side view of a plant holder opening arrangement which may be used for an alternate plant holder from that illustrated in FIGS. 1-4.
Figure 6:
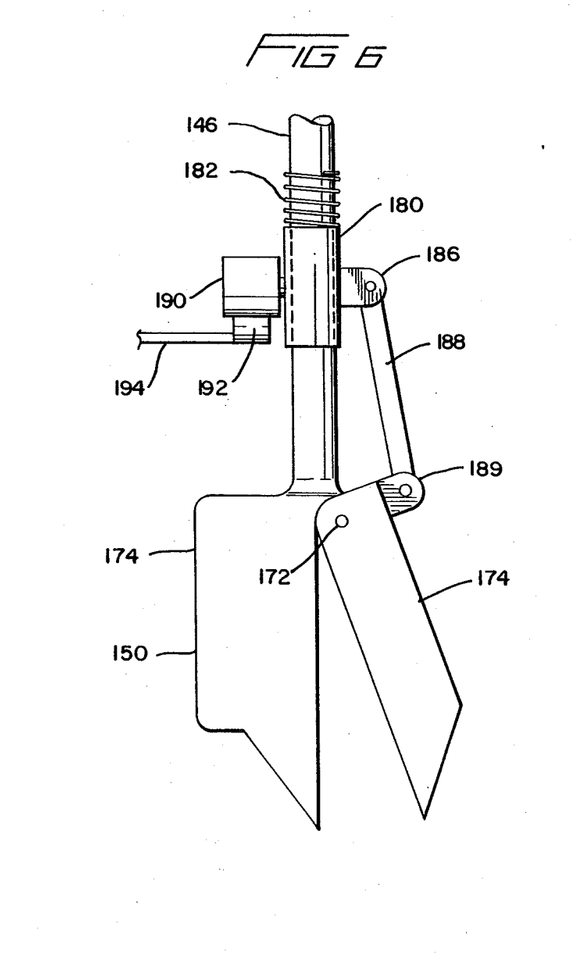
FIG. 6 is a front view of the plant holder or cup of FIG. 5 is its open position.

Although various arrangements could be used opening the plant holders of the present invention, a specific arrangement is illustrated in FIGS. 5 and 6 for a slightly modified plant holder or cup 150. The components shown in FIGS. 5 and 6 have been labeled in the "100" series with the same last two digits as the corresponding part, if any, of the embodiment illustrated in FIGS. 1-4. The holder 150 includes two parts 174 which are pivotably connected together at pivot point or axis 172. Mounted upon the holder arm 146 is a slidable sleeve 180 biased downwardly by a coil spring 182 anchored by a set screw 184 at the upper end of the spring. Attached on one side of the sleeve 180 is a flange 186 pivotably connected to a bar 188 which has its lower end pivotably connected to a flange 189 extending from one of the holder parts 174. A roller 190 is mounted for rotation on the side of the sleeve 180 opposite the flange 186. The roller 190 is mounted for interaction with a cylindrically curved cam surface 192 of a cam member 194. The cam member 194 will be mounted from the trailer 12 (refer back to FIG. 1) such that the roller 190 engages the cam surface 192 only when the holder 150 is adjacent in its unloading position or adjacent thereto. Normally the spring 182 keeps the sleeve 180 relatively close to the holder 150 such that link or bar 188 maintains the holder parts 174 closed together. When the holder arm 146 approaches the unloading position, the roller 190 engages camming surface 192 which pushes the sleeve 180 up against the bias of spring 182 to cause the pivoting of one of the holder parts 174 relative to the other of the holder parts. As soon as the roller 190 has cleared the camming surface 192, the spring 182 will again close the plant holder 150 such that a plant may be dropped into its loading hole 151 as soon as the plant holder reassumes its loading position which occurs at the top of its 360° path.

OPERATION

The motor or other drive means 26 drives the chain belt 28 such that the plant holder 50 will have zero relative velocity to the ground when the plant holder assumes its 50N unloading position. With reference to FIG. 1, the trailer 12 will be moving in a leftward direction, whereas the sleeve 40 (FIG. 2) will be rotating in a counter-clockwise direction such that the translational velocity of the plant holder 50 when it is in its unloading position 50N will have a zero translational velocity relative to the ground, thereby allowing the plant 20 to be dropped to the ground with zero relative translational velocity between the plant and the ground. This allows the plant to be placed directly into a furrow or hole without shock. In order to provide the zero translational velocity between the plant and the ground, it is simply necessary to have the drive means 26 rotate the hub 36 at an angular velocity equal to the translational velocity of the trailer 12 divided by the extended radius of the plant holder 50 to the rotation axis extending centrally through axle 38. This may be accomplished in a number of ways such as having the drive means 26 realized by a gearing arrangement geared to the axle of the trailer 12. The gear ratio could be easily determined such that hub 36 rotates once for a rotation of the trailer wheel times the wheel's radious divided by the extended radious (i.e., 50N position) of holder 50.

As the hub 36 rotates the holders 50 around the rotation axis, the links 52 cause the holder arms 46 to fold inwardly so as to be approximately parallel to the rotation axis extending centrally in axle 38 when the holders 50 assume their loading positions 50L. In that position, the holder 50 will have very little translational velocity because the radius between the holder 50 and the rotation axis central to axle 38 is very small. Effectively, the holder 50 has assumed a dwell position. Its angular velocity is the same as when the holder 50 is in its fully extended unloading position 50N, but it slows in translational velocity. (As used hereafter, "velocity" shall mean translational velocity exclusive of angular velocity. References to the velocity of the holder 50 shall be with respect to the trailer 12 unless express reference is made to the ground.) In the dwell loading position 50L, the holder 50 is moving sufficiently slow that it may be easily loaded through its loading hole 51 either by hand or by another mechanism such as conveyor 18. Because the holder 50 is moving so slowly at this stage, any plants placed into the holder are unlikely to be damaged.

As the plant holder 50 moves from its loading position 50L downward, the corresponding link 52 causes the holder arm 46 to unfold. The spider 58 rotates in unison and at the same angular velocity as the rotating hub 36. When the plant holder 50 has had its corresponding flanges 34 rotated to be below the axle 38, the corresponding link 52 will have completely unfolded the holder arm 46 such that it extends vertically and perpendicular to the horizontal rotation axis. When the machine is transplanting at a constant rate, the drive means 26 will move each holder 50 at a constant angular velocity about the rotation axis, but the links 52 serve as a varying means to vary the velocity depending upon whether the holder is about the axle 38 (slow velocity at point 50L) or below the axle 38 (high velocity due to large radius, but zero relative velocity to ground at point 50N).

Typical dimensions of a transplanter machine for a plant spacing of 30 centimeters with six plant holders would have an effective wheel radius of 28.6 centimeters. It will be appreciated that the present transplanter machine 22 is highly advantageous in providing a high velocity when the plants are unloaded into the ground, the high velocity allowing one to counteract a high vehicle velocity, but simultaneously providing for a relatively low velocity when the plants are loaded into the plant holders 50.

It will be appreciated that each of the holders 50 defines an orientation line along which the stalk of a plant will be generally disposed, the orientation line extending parallel to the holder arm 46. Accordingly, the orientation line of the holder will be horizontal when the holder is in its uppermost position and vertical when the holder is in its unloading position for the preferred embodiment.

Although various specific instructions have been described and shown herein, it is to be understood that these are for illustrative purposes. Various modifications and adaptations will be apparent to those of skill in the art. For example, a camming arrangement could be used to cause the folding and unfolding of the holder arms 46 instead of the links 52. The links 52 could have hook joints with a swivel between the joints instead of the arrangement of ball and socket joints 54 and 56. In view of these and numerous other modifications which are possible, it will be appreciated that the scope of the present invention should be determined by reference to the claims appended hereto.

What is claimed is:

1. A transplanter system comprising:
   (a) a support assembly;
   (b) a plurality of holders, each holder supported by said support assembly, each holder including means to releasably and automatically hold a plant;
   (c) drive means to move each of said holders from an upper, loading position whereat a plant may be placed in the holder to a lower, unloading position whereat the holder automatically releases any plant held in it; and
   (d) varying means to automatically vary the velocity of each holder as it moves between its loading position and its unloading position such that the holder moves at a first velocity when the holder is in its loading position and the holder moves at a second velocity when the holder is in its unloading position, said second velocity greater than said first velocity; and
   wherein said drive means moves each holder at a constant angular velocity about a rotation axis and wherein said varying means varies a radius from each holder to said rotation axis in order to vary the velocity of each holder.

2. A transplanter system comprising:
   (a) a plurality of plant holder means for releasably holding a plant;
   (b) a plurality of holder arms, each holder arm having a first end and a second end at least one of said holders mounted at a respective said first end;
   (c) a support assembly defining a rotation axis and rotatably supporting each of said second ends for rotation about said rotation axis;
   (d) drive means to rotate each of said holder arms and corresponding holders about said rotation axis; and
   (e) varying means to automatically vary a radius from each holder to said rotation axis as each holder rotates about said rotation axis such that the radius is relatively small when the holder is in an upper, loading position whereat a plant may be placed in the holder and is relatively large when the holder is in a lower, unloading position whereat the holder will release any plant held; and
   wherein said support assembly includes a rotatable hub mounted on an axle, said rotation axis extending lengthwise through said axle, and wherein said holder arm is pivotably mounted to said rotatable hub, and wherein said varying means automatically varies the velocity of each holder as it moves between said loading position and said unloading position such that the holder moves at a first velocity when the holder is in its loading position and the holder moves at a second velocity when the holder is in its unloading position, said second velocity being greater than said first velocity.

3. The transplanter system of claim 2 further comprising a chassis and moving means for moving the chassis in a forward direction relative to the ground and wherein said drive means moves each holder in a continuous manner during operation of the system, said varying means varying the radius of each holder relative to said rotatable hub.

4. The transplanter system of claim 3 wherein said drive means moves each holder in a backward direction relative to forward movement of said chassis when the holder is in its unloading position and at least partially in a sideways direction, perpendicular to said forward movement between its loading position and its unloading position.

5. The transplanter system of claim 2 wherein said varying means includes a plurality of links, each link having a first end pivotably attached to a corresponding holder arm, each link folding the corresponding holder arm inwardly towards the rotation axis when the corresponding holder arm assumes its unloading position, and each link unfolding the corresponding holder arm away from the rotation axis when the corresponding holder assumes its unloading position.

6. The transplanter system of claim 2 wherein said drive means moves each holder in a continuous manner during operation of the system, said system mounted on a movable chassis, and operating as said chassis moves relative to the ground.

7. The transplanter system of claim 6 wherein each holder defines an orientation line along which the stalk of a plant will be disposed when the plant is in the holder and wherein said drive means moves each holder such that the orientation line of each holder is:
   within 20° of horizontal when the holder is in its uppermost position; and
   within 10° of vertical when the holder is in its unloading position.

8. The transplanter system of claim 2 wherein each holder arm is pivotably mounted to said rotatable hub at a corresponding pivot axis and each pivot axis is askew to said rotation axis.

9. A transplanter system comprising:
   (a) a support assembly;
   (b) a plurality of automatic release plant holder means, each holder means supported by said support assembly to releasably hold a plant;
   (c) drive means to move each of said holder means from an upper, loading position whereat a plant may be placed in the holder means to a lower, unloading position whereat the holder means automatically releases any plant held in it; and
   (d) varying means to automatically vary the velocity of each holder means as it moves between its loading position and its unloading position such that the holder means moves at a first velocity when the holder means is in its loading position and the holder means moves at a second velocity when the holder means is in its unloading position, said second velocity being greater than said first velocity; and further comprising a plurality of holder arms, each holder arm having a corresponding holder means at a first end and rotatably supported by said support assembly at a second end, wherein said drive means is operable to rotate each holder about a rotation axis, and wherein said varying means includes a plurality of links, each link having a first end pivotably attached to a corresponding holder arm, each link folding the corresponding holder arm in towards the rotation axis when the corresponding holder arm assumes its loading position, and each link unfolding the corresponding holder arm away from the rotation axis when the corresponding holder assumes its unloading position, and wherein each link has a second end pivotably attached to a rotating spider.

10. The transplanter system of claim 9 wherein each of said holder arms is pivotably mounted to said support assembly at a separate pivot axis and wherein each of the pivot axes is askew to said rotation axis.

11. A transplanter system comprising:
(a) a support assembly;
(b) a plurality of holders, each holder having means to releasably hold and automatically release a plant;
(c) drive means to move each of said holders from an upper, loading position whereat a plant may be placed in the holder to a lower, unloading position whereat the holder automatically releases any plant held in said holder; and
(d) varying means for automatically varying the velocity of each holder as it moves between its loading position and its unloading position such that the holder moves at a first velocity when the holder is in its loading position and the holder moves at a second velocity when the holder is in its unloading position, said second velocity being greater that said first velocity; and
wherein said drive means includes power source means to move each holder in a continuous manner during operation of the system and means for moving said support assembly, said system being operable during continuous movement of said support assembly relative to the ground, said drive means moving each holder in a cycle of 360°, path defining means, said path defining means causing movement of said holder from its loading position to its unloading position by a first path and from its unloading position back to its unloading position by a second path distinct from said first path, each holder has an uppermost position within 15° of its loading position, each holder defines an orientation line along which the stalk of a plant will be disposed when the plant is in the holder, said drive means moves each holder such that the orientation line of each holder is:
within 20° of horizontal when the holder is in its uppermost position; and
within 10° of vertical when the holder is in its unloading position; and
wherein said drive means moves each holder at a constant angular velocity about a rotation axis throughout said cycle of 360° when transplanting at a constant rate and wherein said varying means operates to vary a radius from each holder to said rotation axis in order to vary the velocity of each holder.

12. The transplanter system of claim 11 further comprising a plurality of holder arms, each holder arm having a first end and a second end, at least a corresponding one of said holders mounted at each first end, each second end rotatably supported by said support assembly such that each holder is supported by said support assembly by way of one of said holder arms.

13. The transplanter system of claim 12 wherein each holder arm is pivotably mounted at its second end to a corresponding pivot axis on said support assembly, each pivot axis being askew to said rotation axis.

14. The transplanter system of claim 12 wherein said support assembly includes a rotatable hub mounted on an axle, said rotation axis extending lengthwise through said axle, and wherein each holder arm is pivotably mounted to said rotatable hub.

15. The transplanter system of claim 14 wherein said varying means includes a plurality of links, each link having a first end pivotably attached to a corresponding holder arm and a second end pivotably attached to a rotating means whereby each link folds the corresponding holder arm in towards the rotation axis when the corresponding holder assumes its loading position, and each link unfolds the corresponding holder arm away from the rotation axis when the corresponding holder assumes its unloading position.

16. The transplanter system of claim 15 wherein said rotating means is a rotating spider.

17. The transplanter system of claim 16 wherein each holder includes at least two holder parts pivotably connected together, said holder parts being normally closed, and means to pivotably open the holder in its unloading position.

* * * * *

UNITED STATES PATENT AND TRADEMARK OFFICE
CERTIFICATE OF CORRECTION

PATENT NO. : 4,788,920
DATED : December 6, 1988
INVENTOR(S) : Lawrance N. Shaw

It is certified that error appears in the above-identified patent and that said Letters Patent is hereby corrected as shown below:

Claim 11, column 9, line 47, "unloading", (second occurrence) should be --loading--.

Signed and Sealed this

Sixteenth Day of May, 1989

Attest:

DONALD J. QUIGG

Attesting Officer

Commissioner of Patents and Trademarks